Dec. 17, 1968 D. M. WEITZNER 3,416,241

ELECTROACOUSTIC LANGUAGE TEACHING DEVICE

Filed March 1, 1967 4 Sheets-Sheet 1

INVENTOR

Dorothea M. Weitzner

BY Polachek & Saulsbury

ATTORNEYS

ELECTROACOUSTIC LANGUAGE TEACHING DEVICE

Filed March 1, 1967 4 Sheets-Sheet 2

INVENTOR

Dorothea M. Weitzner

By Polachek & Saulsbury

ATTORNEYS

INVENTOR
Dorothea M. Weitzner
BY
Polachek & Saulsbury
ATTORNEYS

Dec. 17, 1968 D. M. WEITZNER 3,416,241

ELECTROACOUSTIC LANGUAGE TEACHING DEVICE

Filed March 1, 1967 4 Sheets-Sheet 4

INVENTOR

Dorothea M. Weitzner

BY Polachek & Saulsbury

ATTORNEYS

United States Patent Office 3,416,241
Patented Dec. 17, 1968

3,416,241

ELECTROACOUSTIC LANGUAGE TEACHING DEVICE

Dorothea M. Weitzner, 8 E. 62nd St., New York, N.Y. 10021

Filed Mar. 1, 1967, Ser. No. 619,712
10 Claims. (Cl. 35—35)

ABSTRACT OF THE DISCLOSURE

The disclosure describes an assembly including a cabinet in which a language card can be inserted for reading electromagnetically or electrooptically. On the card are magnetic or optically recorded signal tracks corresponding to spoken words inscribed in adjacent lines on the card. Reading is done by a hand-held, manually operable electroacoustic transducer device having magnetic or optical pickup and reproducing heads. Recording can be done by the same transducer device on magnetic or optical tracks of a card. A moving belt in the cabinet guides the transducer device along the tracks during signal recording and reproducing.

This invention relates to the art of educational devices but more particularly concerns electroacoustic language teaching devices.

According to the invention there is provided a device into which a card can be fitted. The card has a plurality of alternate printed lines and acoustic recorded signal lines or tracks. The recorded tracks may be mangnetic or optical film tracks. A slotted motor driven moving belt in the device moves over the card. A manually operable electroacoustic transducer device can be inserted in a hole in the belt to travel along a recorded track. The transducer device picks up the recorded data and reproduces it acoustically. The transducer device can be arranged to record data on the track as well as pickup and playback recorded data. Slots in the belt provide access to the card for writing or printing words thereon corresponding to the data recorded on the signal tracks. Data recorded on the signal tracks can be erased and rerecorded with other data.

It is therefore a principal object of the invention to provide an educational device, which may be used for comparative language teaching, as a comparative language dictionary or the like, with language cards having written or having recorded data corresponding to the words on the printed lines.

A further object is to provide a device as described, comprising a cabinet in which a language card can be inserted under a slotted moving belt in the cabinet, the belt being drive nat a constant speed for guiding a hand-held, manually operable electroacoustic transducer device over a selected signal track on the card.

A further object is to provide a hand-held, manually operable electroacoustic transducer device for use in an assembly as described, the transducer device being arranged for selectively picking up and reproducing audibly data recorded on the signal tracks, or for recording acoustic data on the signal tracks.

Another object is to provide an electroacoustic transducer device having optical or magnetic means for acoustically recording data and for picking up and reproducing audibly data recorded in optically or magnetically on the tracks of a language card.

A further object is to provide a language card having optical signal tracks or magnetic signal tracks alternating with written lines.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

Figures 1, 2, 3:
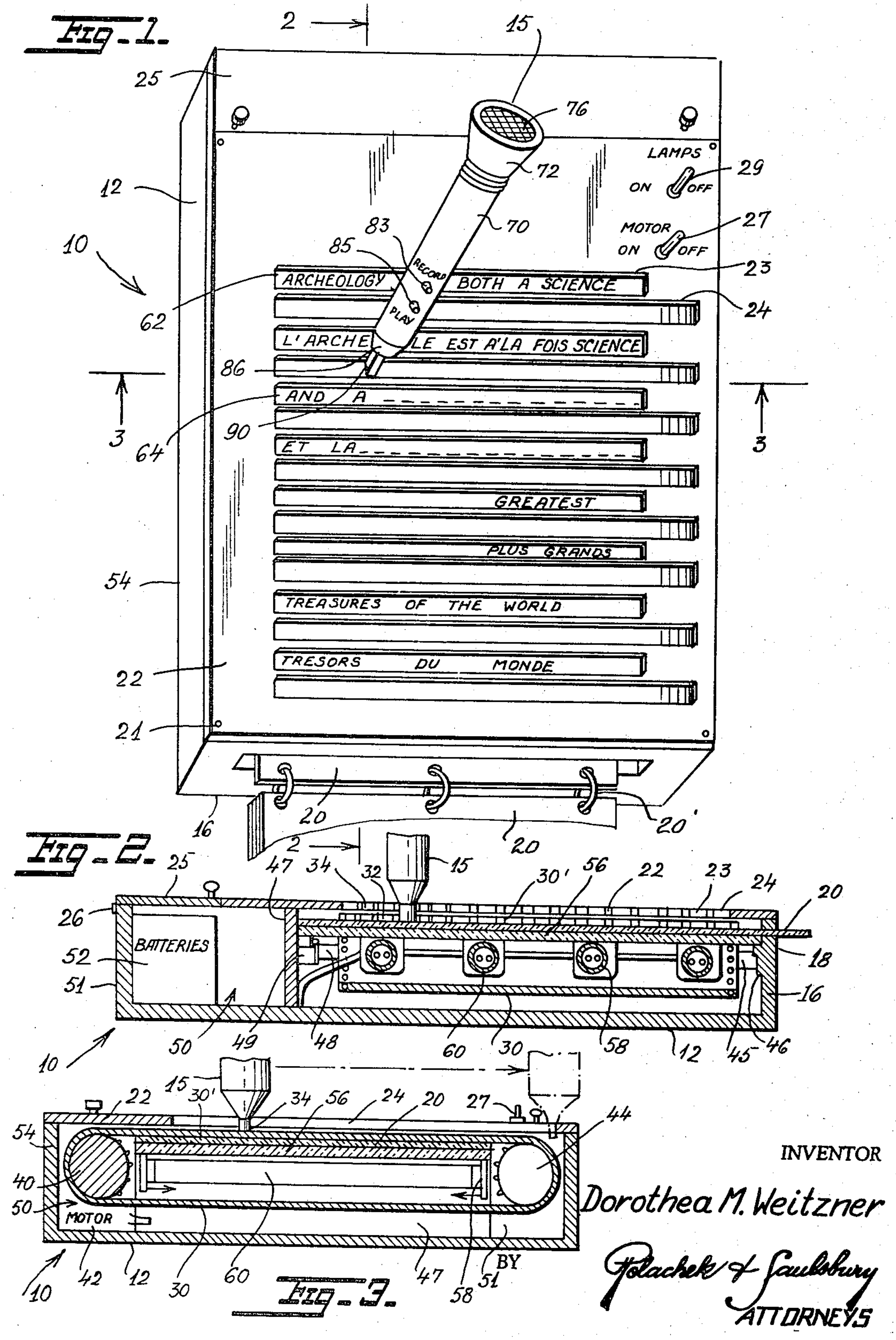
FIGURE 1 is an oblique top view of an assembly embodying the invention, including a cabinet, electroacoustic transducer device and language card.
FIG. 2 and FIG. 3 are longitudinal and transverse vertical sectional views taken on lines 2—2 and 3—3 respectively of FIG. 1.

Referring first to FIGS. 1–3, there is shown an assembly 10 including a cabinet 12, electroacoustic transducer device 15 and language card 20. The cabinet 12 is a shallow rectangular box having a front wall 16 in which is a slot 18. A rectangular card 20 can be inserted into this slot in a horizontal position parallel to top panel 22 of the box. The top panel of the box is a rectangular plate held on by screws 21. The panel 22 is formed with a plurality of parallel cross slots 23, 24. Slots 23 are slightly shorter than slots 24. Slots 24 extend further to the right than slots 23 as clearly shown in FIG. 1. A narrow door 25 is secured by hinge 26 to the top of the box and provides access into the box for insertion of batteries and for storage of the device 15 when not in use. Control switches 27, 29 are mounted on panel 22.

Figure 4:
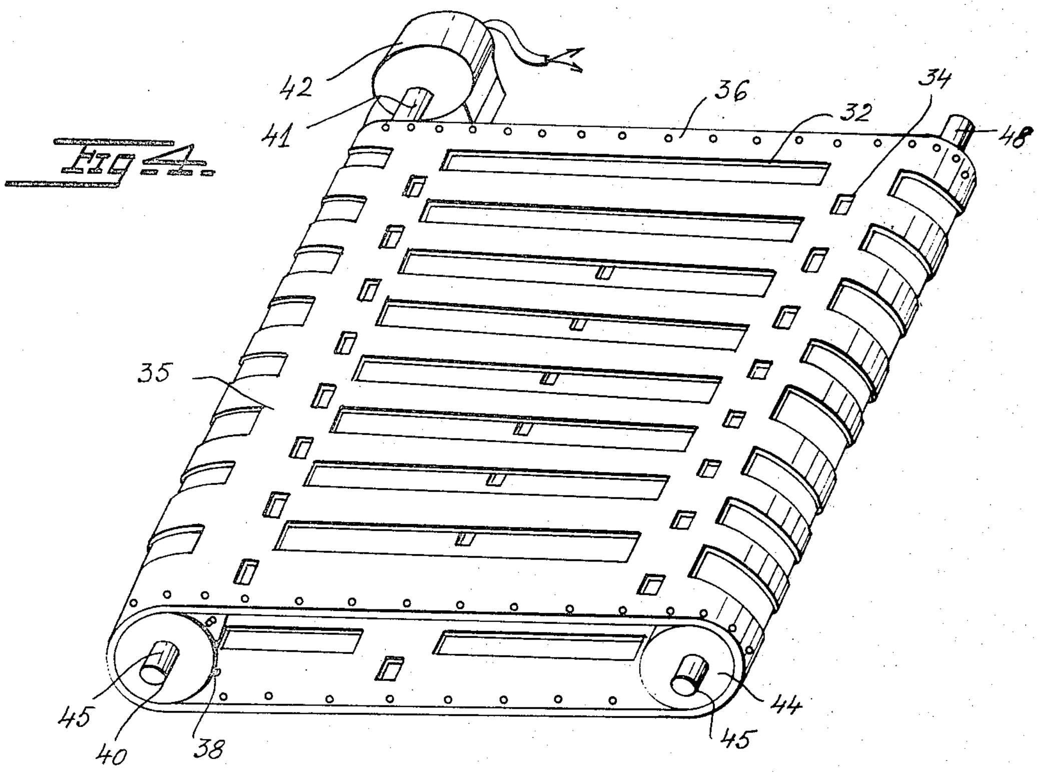
FIG. 4 is a perspective view of a belt and drive rollers employed in the cabinet device of FIGS. 1–3.

Inside the box as best shown in FIGS. 2, 3 and 4 is an endless belt 30 made of opaque flexible metal or plastic sheet material. The belt has a plurality of spaced parallel cross slots 32 which register with slots 23 in panel 22. Alternating with the slots 32 are rectangular holes 34 which register with slots 24 in panel 22. There are groups of three slots 32 each disposed in longitudinal alignment around the belt and spaced at their ends by webs 35. Centered in webs 35 are holes 34. There are three spaced holes 34 on each transverse line around the belt. Near opposite edges of the belt are spaced holes 36. These holes receive sprocket pins 38 extending radially out of a drive roller 40 which extends longitudinally of and between both sides of the belt. Roller 40 is coupled by shaft 41 to a constant speed motor 42 located inside the box. The motor drives the belt. The belt is also entrained on an idler roller 44 extending parallel to roller 40. Front end stub shafts 45 of the rollers are engaged in bearings 46 on the rear side of front wall 16 of the cabinet. Rear stub shaft 48 of roller 44 is journaled in a bearing 49 on a vertical partition 47 disposed parallel to front wall 16 inside the box. In storage compartment 50 between the partition 47 and rear wall 51 of the cabinet are removable and replaceable batteries 52 connected in circuit with the motor 42 to energize it.

The rollers 40 and 42 are disposed horizontally and axially parallel to the side walls 54 of the cabinet. The upper course 30' of the belt is slightly spaced from the underside of panel 22 so as not to rub against it. This upper course is supported by a horizontal transparent glass or plastic plate 56 when card 20 is disposed between the upper course of the belt and plate 56. Plate 56 is supported by front wall 16 and partition 47. At the underside of plate 56 are mounted lamp brackets 58 supporting a plurality of tubular lamps 60. The lamps provide high illumination under the plate and shine through slots 32 and holes 34 of the belt as well as through slots 23 and 24 of panel 22, except when interrupted by imperforate parts of the belt or by opaque parts of card 20.

Figure 5:
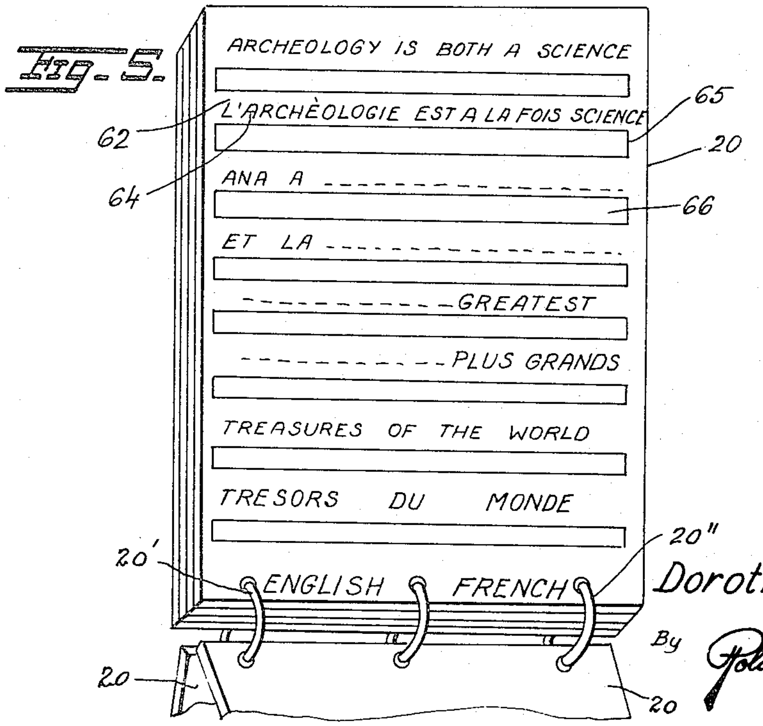
FIG. 5 is an oblique top view of a pile of language cards arranged according to the invention.

FIG. 5 shows a pile of cards 20 each arranged like the topmost one of the cards. Each card has a plurality of spaced parallel transverse lines 62 with inscribed words or phrases 64 in any desired language. Adjacent each line 62 and alternating therewith are transparent windows 65 on which are optical signal tracks 66. These tracks have lines of varying transparency and represent recorded acoustic data corresponding in sound to the words or phrases 64 adjacent thereto. Each card 20 can be made of transparent or opaque material. If the card is a transparent plastic film sheet, then the tracks 66 can be sensitized, exposed and developed photosensitive strips. Alternatively if the card is made of opaque material, then the windows 65 will be rectangular openings in the card across which are secured photographic film with sensitized, exposed and developed areas thereon. The sensitized areas can be on the upper side or on the under side of the card.

In the arrangement of the card 20 shown in FIG. 5, alternate lines 62 are inscribed with English words while the other lines are inscribed with corresponding French words. This is, of course, only exemplary, and is intended for teaching a foreign language to the user in providing comparable translations both visually by the printed words and audibly by use of the transducer device 15.

The transducer device 15, shown in FIGS. 1, 2, 3, 6 and 7, is intended to be held in the hand of the user and manually operated. The device 15 has a cylindrical barrel or casing 70. A flaring shell 72 is screwed on the end of the barrel. A microphone-loudspeaker 75 is mounted in the shell and is protected by a screen 76 in the widest end of the shell. Inside the barrel is a battery 78, transistorized modulator 79 and transistorized amplifier 80. A pair of switches 82, 84 are provided in the barrel 70. The switches are operated by push-buttons 83, 85 and are designated respectively "RECORD" and "PLAY" on the barrel.

Figures 6, 7, 8, 9, 12, 13, 14:
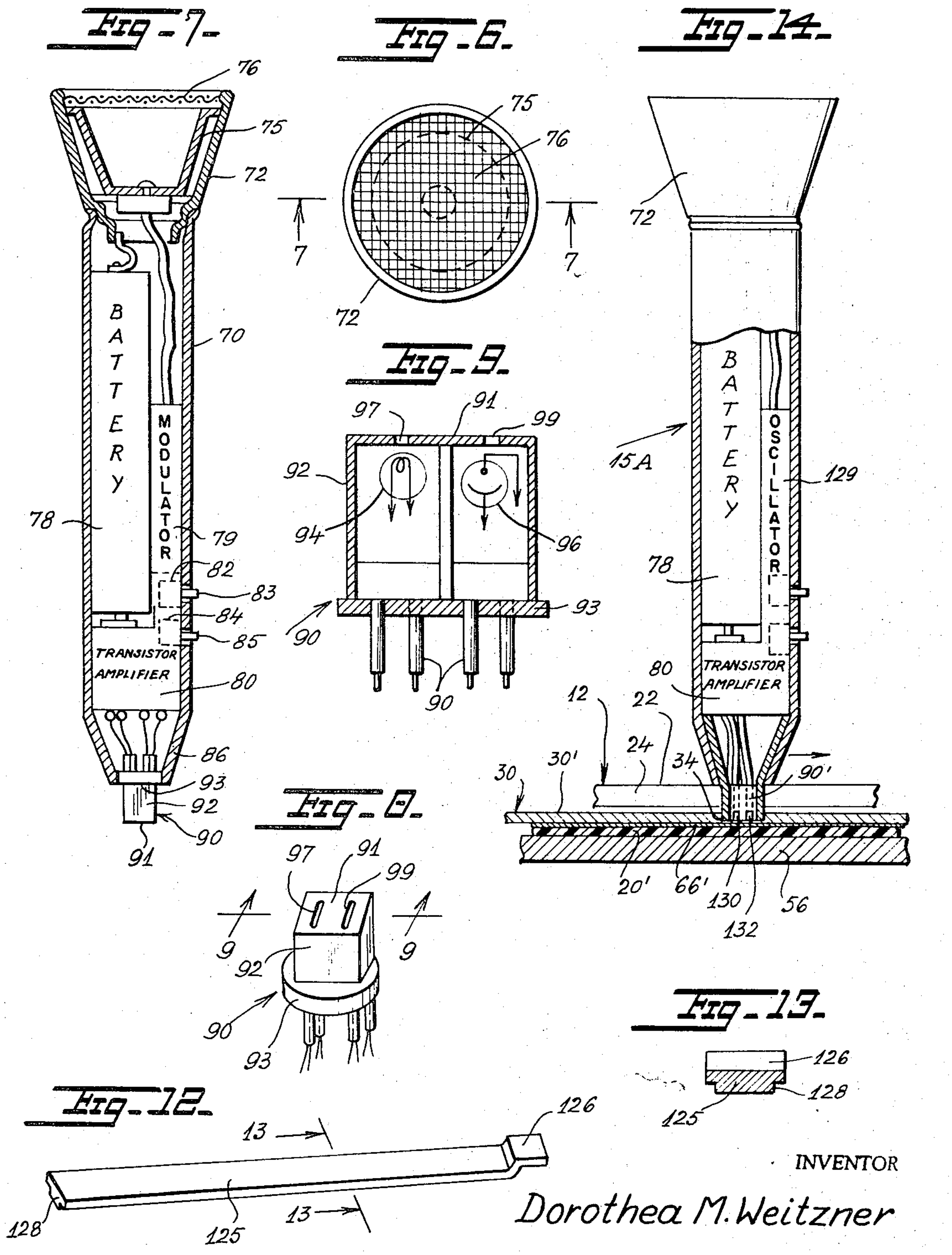
FIG. 6 is an enlarged top view of the electroacoustic transducer device.
FIG. 7 is a vertical sectional view taken on line 7—7 of FIG. 6.
FIG. 8 is an enlarged perspective view in an inverted position of a reading and writing head employed in the electroacoustic transducer device.
FIG. 9 is a further enlarged sectional view taken on line 9—9 of FIG. 8.
FIG. 12 is a perspective view of a masking strip which may be employed on the cabinet.
FIG. 13 is an enlarged cross sectional view taken on line 13—13 of FIG. 12.
FIG. 14 is a view partially in section and similar to FIG. 7, showing another transducer device.

The barrel 70 has a narrow tapered end 86 in which is mounted an electrooptical transducer element 90. This element extends out of the barrel. Element 90 is connected in circuit with the electrical components in the barrel 70 as is explained below in connection with FIG. 10. Element 90 has a generally rectangular casing 92 as best shown in FIGS. 8 and 9. Inside the casing is a small projection lamp 94 and photoelectric cell 96. Lead wires 98 are connected to the cell and lamp. The casing 92 has an annular flange 93 which fits tightly in the narrow bottom end of barrel 70. Two narrow slits 97 and 99 are formed in the flat end 91 of the element. The cell and lamp are exposed to these slits for admitting light to cell 96 and for transmitting light from lamp 94 respectively.

Figures 10, 11, 15:
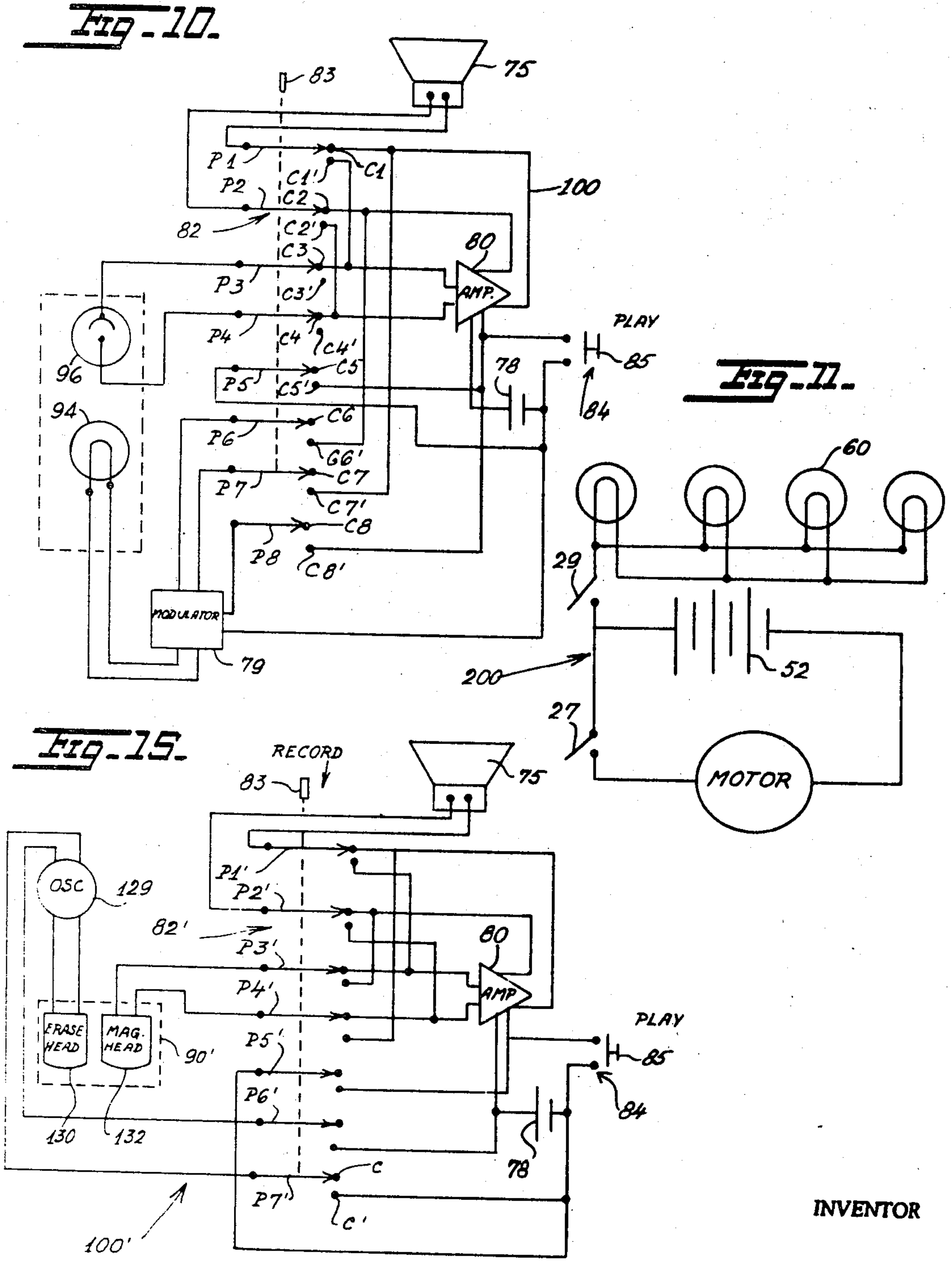
FIG. 10 is a diagram of the electric circuit of the transducer device of FIG. 8.
FIG. 11 is a diagram of the electric circuit employed in the cabinet of the assembly.
FIG. 15 is diagram of the electric circuit of the transducer device of FIG. 14.

The device 15 employs circuit 100 shown in FIG. 10. The battery 78 is connected to the power supply terminals of amplifier 80 via normally open PLAY switch 84. The switch is a pushbutton switch operated by pressing button 85. This applies power to the amplifier to energize it. The RECORD switch 82 has eight poles P1–P8. These poles are normally closed with contacts C1–C8. In this position of the switch as shown in FIG. 10, the output terminals of the amplifier are connected through the switch to the microphone-loudspeaker 75. The photoelectric cell 96 is connected to the signal input of the amplifier. Thus when the cell is exposed to recorded areas of varying optical brilliance, varying at audio frequencies, loudspeaker 75 reproduces audibly sounds corresponding to the recorded areas.

When switch button 83 is pressed, poles P1–P8 are thrown to contacts C1'–C8'. Then the battery 78 is connected to power supply terminals of both the amplifier 80 and modulator 79. The output of the modulator is connected to lamp 94. The microphone-loudspeaker is now connected to the input of amplifier 80. The output of the amplifier is connected to modulator 79. Thus the lamp 94 produces a modulated light varying in intensity or brilliance depending on the amplitude and frequency of sounds impinging on the microphone-loudspeaker.

FIG. 11 shows a circuit employed in cabinet 12. Circuit 200 has lamps 60 connected to batteries 52 via switch 29. Motor 42 is connected to the battries via switch 27. Thus the motor and lamps are independently operated depending on which switch is closed.

In operation of assembly 10 for record reproducing purposes, the operator will insert a card 20 into the cabinet through slot 18 in wall 22. The card will underlay the upper course 30' of the belt 30. The operator will now set MOTOR switch 27 to ON position until holes 34 all appear at the left end of slots 23. Then he will turn switch 27 off. He will also turn switch 29 ON. The inscriptions 64 on the card will all be visible through registering slots 32 in the belt and slots 23 of panel 22. Now the operator will grasp the transducer device 15 in one hand, and while holding it vertically he will insert element 90 through a slot 24 into a selected hole 34 of the belt. He will turn switch 27 to ON again and at the same time will press button 85 of PLAY switch 84. The lamps 60 will illuminate the selected track 66 and light of varying intensity will pass to the photoelectric cell through the selected hole 34 in the belt and slit 99 in the element housing 92. The operator will move the device 15 along selected slot 24 in panel 22 guided by the moving belt which is driven by motor 42 at constant speed. The operator can select one track 66 for example to hear the words appearing in English or can select another track to hear the corresponding words in French while he reads the English or French words. If desired, he can cover the words in any track by using a masking strip 125 as shown in FIGS. 12 and 13.

The masking strip 125 is a rigid or flexible member having an offset end 126 which serves as a handle. The strip has a lower ridge 128 which fits into any selected slot 23 to cover the words 64. Thus the operator can cover the words 64 in either language while he listens to them by use of device 15 and translates mentally. Then he can remove the strip 125 to expose the written words and check his mental translation. Thus the assembly can be used in a variety of ways for instruction, review and test in learning languages.

The apparatus of the assembly can also be used to record data corresponding to any desired words and phrases by using a new card 20. Before or after inserting such a new card 20 in cabinet 12, the operator can write words on lines 62 exposed through slots 23 in panel 22 and through slots 32 in the belt. By turning switch 27 to ON, the operator will line up holes 34 with the left end of slots 24. Switch 29 will be OFF so the lamps 60 will be extinguished. A plurality of identical strips 125 will be inserted in all slots 24 except the one in which recording is to be performed. This is done to avoid exposing the sensitized, unexposed and undeveloped tracks 66 of card 20 to ambient light. Now the element 90 of device 15 is inserted into the hole 34 of the selected slot 24. The switch 27 is turned to ON to start the motor driving the belt and the operator presses the RECORD button 83 to actuate switch 82. Now the operator speaks into the loudspeaker-microphone 75 and the acoustic signals are translated into light pulsations by the circuit 100. The light pulsations are emitted by lamp 94 through slot 97 in the element housing 92. As the belt moves along, the operator moves the device 15 with the belt. Thus the operator's spoken words are recorded on a selected track 66. After this line is completed, the operator will remove a cover strip 125 from another slot 24 and will place this strip in the slot 24 where recording has been completed. This is to prevent the recorded track 66 from being exposed to ambient light as the belt 30 is driven along during recording of signals on the newly selected track. By this means, the spoken words corresponding to the words inscribed on lines 62 can be electrooptically recorded on tracks 66. After all tracks are recorded, card 20 can be removed and the exposed surfaces can be developed by conventional photographic methods. The card 20 with developed and fixed tracks of varying light intensity can now be read electroacoustically in the manner described by use of device 15, set to PLAY position.

FIG. 14 shows another device 15A which is similar to device 15, and corresponding parts are identically numbered. Device 15A is used for magnetically recording signals on record tracks of a card 20′ or of magnetically picking up and acoustically reproducing recorded signals. Instead of optical tracks, the card 20′ has magnetic tracks 66′ arranged like tracks 66 on card 20. Cabinet 12 is used in the same manner as described above. In device 15A, modulator 79 is replaced by an oscillator 129 used to erase recorded signals from tracks 66′. Element 90′ replaces element 90 of device 15. It has two magnetic heads 130 and 132 located in closely spaced positions. When the device 15A is held vertially as shown in FIG. 14, and element 90′ is inserted through a slot 24, heads 130 and 132 will be close to the magnetic track 66′ exposed through hole 34 in the belt. There head 132 can record magnetically on the track while head 130 erases previously recorded signals; or head 132 can be used alone for picking up recorded signals. This is done by means of circuit 100A shown in FIG. 15. Parts corresponding to those of circuit 100 are identically numbered.

The circuit 100A is normally arranged so that when button 85 of the PLAY switch 84 is closed, the amplifier 80 is energized. Then the magnetic head 132 is connected to the signal input terminals of amplifier 80 and the loudspeaker-microphone 75 is connected to the output terminals of the amplifier. Switch 82′ has seven poles P1″–P7″ normally closed with contacts C. The head 132 and loudspeaker-microphone are connected to the amplifier through poles P1′–P4′ of the switch 82′. Then when the operator moves the device 15′ along the selected slot 24, head 132 picks up the magnetically recorded signals and these signals are reproduced audibly.

If the operator wishes to record new signals on the same tracks in place of the signals already there, he will set switch 82′ to RECORD position by pressing button 83. This closes poles P1′–P7′ with contacts C′. Now oscillator 129 and amplifier 80 are energized via the switch 32′. The erase head 130 is placed to the right of the recording head 132 when the belt drives from left to right and the device 15A is moved in the same direction. Thus head 130 erases signals magnetically recorded previously on tracks 66′ while head 132 records new signals on the track. The new signals recorded will correspond to the words spoken into the loudspeaker-microphone 75 by the operator as he moves the device 15A along the selected slot 24 of panel cabinet panel 22.

The device 15A has the advantage that easy erasing and recording is possible. Also, the record tracks 66′ on cards 20′ are not light sensitive. However photoelectric recording by device 15 on photographic tracks 66 of cards 20 may be preferred because of greater permanence of recording.

In any case, the cabinet 12 can be used interchangeably for recording on and reproducing from magnetic or optical tracks. If the devices 15 and 15A are both suppled, they can be stored in compartment 50 under door 25 of the cabinet. Then either device can be removed for use when desired.

The assembly described is particularly intended as an educational device for language teaching, but it will be apparent that it has numerous other applications in many different fields.

The cards 20 of FIG. 5 can be joined together by rings 20″ and the box assembly 10 thrust over the individual cards.

It shall be understood that a slotted plate may be used for guiding the pick-up transducer device over a page of a book-format made up of permanently bound cards or semi-rigid sheets upon which the sensitized areas or track are disposed, this same slotted plate being adapted to be inserted between any of the pages of the book and upon any one page thereof.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. An assembly for educational purposes as described, comprising a generally rectangular flat box having a top panel, said panel being formed with a plurality of parallel slots extending transversely of the panel, an endless belt inside the box, means movably supporting the belt so that one side thereof moves parallel to and underneath said panel, a plate horizontally disposed in the box for supporting a card thereon, said card having a plurality of inscribed lines thereon alteranting with signal tracks having recorded data corresponding to the inscribed lines, said plate being located under said one side of the belt, said belt having slots thereon registering with alternate ones of the slots in the panel for exposing the inscribed lines of the card through certain alternate slots in the panel, said belt having spaced holes located between the slots in the belt for exposing only small points of said signal tracks on the card through other slots in the panel, said holes being arranged to engage a data recording and reproducing element of a transducer device therein, and motor means operatively connected to the belt for driving the same at a constant speed, so that inscribed lines on the card are visible through said certain slots in the panel while the belt moves, and so that data recorded on said tracks are picked up by said element while the transducer device is guided by the belt at a constant speed along a particular slot of said panel.

2. An assembly as recited in claim 1, wherein said plate is transparent, and further comprising illumination means under the plate for illuminating said signal tracks so that data thereon is picked up optically by said element.

3. An assembly as recited in claim 1, further comprising means for closing selected ones of the slots to conceal certain of the inscribed lines while recorded data is being reproduced from said particular track.

4. An assembly as recited in claim 1, further comprising a transducer device having a cylindrical barrel, loudspeaker-microphone in one end of the barrel, amplifier means in the barrel, circuit means interconnecting said element, amplifier and loudspeaker-microphone, and switch means in said circuit having one position wherein data picked up from a signal track of the card by said element is reproduced audibly by said loudspeaker-microphone, said switch means having another position, wherein sounds spoken into the loudspeaker-microphone are translated and applied through said element for recording on a signal track of said card.

5. An assembly as recited in claim 4, wherein the signal tracks are magnetic tracks, and said element includes recording and reproducing magnetic heads.

6. An assembly as recited in claim 4, wherein said plate is transparent, and further comprising illumination means under the plate for illuminating the signal tracks, said signal tracks having varying transparency corresponding to data recorded thereon, so that the data is picked up optically by said element when said switch means is in said one position.

7. An assembly as recited in claim 6, wherein said element includes a photoelectric cell for picking up optically data from the illuminated signal tracks.

8. An assembly as recited in claim 4, wherein said element includes a lamp which emits light pulses when said switch means is in said other position, and wherein said signal tracks are photosensitive, so that said sounds are recorded on the photosensitive tracks as optical pulses.

9. An assembly as recited in claim 8, further comprising means for closing selected ones of the slots in said panel to prevent exposure of all photosensitive tracks except one on which light pulses are being recorded.

10. An assembly as recited in claim 7, wherein said element further includes a lamp which emits light pulses when said switch means is in said other position and wherein said signal tracks are photosensitive, so that said sounds are recorded on the photosensitive tracks as optical pulses, and other switch means in circuit with said illumination means for turning off illumination when said lamp is activated to emit light pulses when the first named switch means is in said other position.

References Cited

UNITED STATES PATENTS

| | | | |
|---|---|---|---|
| 2,369,572 | 2/1945 | Kallmann | 35—35.3 |
| 2,420,716 | 5/1947 | Morton et al. | |
| 2,548,011 | 4/1951 | Frost | 35—35.3 |
| 2,650,097 | 8/1953 | Erdos | 35—35.3 XR |
| 2,822,425 | 2/1958 | Hicks. | |

EUGENE R. CAPOZIO, *Primary Examiner.*

WILLIAM H. GRIEB, *Assistant Examiner.*